2,868,803

NEW PYRAZOLES AND METHOD OF PREPARING SAME

Jean Druey, Riehen, and Paul Schmidt, Therwil, Switzerland, assignors to Ciba Pharmaceutical Products Inc., Summit, N. J.

No Drawing. Application February 4, 1957
Serial No. 637,898

Claims priority, application Switzerland
February 10, 1956

8 Claims. (Cl. 260—310)

This invention relates to new pyrazoles and a process for preparing them. We have found that, when α-cyano-α-formyl-acetic acid esters, such as lower alkyl esters, e. g. the methyl, ethyl, propyl or butyl ester, preferably in the form of a reactive aldehyde derivative thereof is reacted with hydrazine new and valuable pyrazole compounds are obtained, namely 3-amino-pyrazoles of the formula

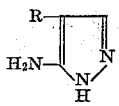

wherein R represents an esterified carboxyl group, preferably a lower carbalkoxy group.

The reactive aldehyde derivatives to be used are primarily enol ethers, acetals or mercaptals. There are used as starting materials above all the lower alkoxy-methylene-cyanoacetic acid lower alkyl esters, such as the ethoxy-methylene-cyanoacetic acid ethyl ester.

The condensation of the α-cyano-α-formylacetic acid esters or their aldehyde derivatives with hydrazine to form pyrazoles takes place under mild conditions, partly at room temperature, and is an exothermic reaction. It is also possible to work at a higher temperature and in the presence of a condensing agent, such as for example in the presence of an acid. The use of a diluent, such as an alcohol, toluene or chloroform, is of advantage. A typical example of this invention is the reaction of ethoxy-methylene-cyanoacetic acid ethyl ester with hydrazine as represented by this diagram:

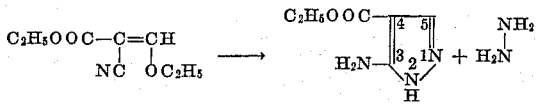

The new pyrazoles obtained by the above process, especially 3-amino-4-carbomethoxy or carbethoxy-pyrazole are valuable intermediate products.

They can be reacted with amides or thioamides of carbonic, formic or acetic acid, such as formamide, urea, thiourea or guanidine to yield 4-hydroxy-pyrazolo(3,4-d)-pyrimidines of the formula

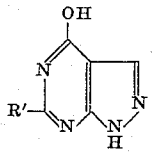

wherein R' represents hydrogen or a methyl, hydroxyl or amino group.

Such reactions are described in our copending application Serial No. 637,896, filed February 4, 1957.

The condensation to form these 4-hydroxy-pyrazolo-pyrimidines is carried out preferably at temperatures above 100° C., if desired in the presence of a diluent and/or a condensing agent in an open vessel or under pressure. The resulting 4-hydroxy-pyrazolo(3,4-d)pyrimidines can be substituted in conventional manner, especially at the ring nitrogen atoms, or the substituents that are present can be converted into other substituents. Thus hydroxyl groups may be etherified or esterified, or may be exchanged for halogen atoms, or hydroxyl groups may be exchanged for sulfur atoms. The halogen atoms can be exchanged for hydroxyl groups or etherified hydroxyl or mercapto groups or by amino or hydrazino groups or hydrogen. It is also possible to treat the resulting compounds with reactive esters of alcohols, as for example with alkyl halides or dialkyl sulfates to form derivatives substituted at the nitrogen, at the oxygen and/or at the sulfur atom. Hydroderivatives can also be obtained by treatment with hydrogenating agents, such as catalytically activated hydrogen. These conversions are made in per se conventional manner. The 4-hydroxy-pyrazolo(3,4-d)pyrimidines and their derivatives have caffein-like or theophylline-like actions, and can be used as medicaments, e. g. stimulants and diuretics. The manufacture of new and valuable compounds of this kind from the 3-amino-pyrazoles obtained according to this invention is described in our above-mentioned copending application. Certain 4-amino-pyrazolo(3,4-d)-pyrimidines, such as 4-amino-pyrazolo(3,4-d)pyrimidine, which are obtainable from the 4-hydroxy-pyrazolo(3,4-d) pyrimidines, are known.

From the products of this invention, acid addition salts can be prepared in the usual manner with inorganic or organic acids, as for example with hydrohalic acid, sulfuric acids, nitric acid, perchloric acid, phosphoric acid, formic acid, acetic acid, propionic acid, lactic acid, oxalic acid, succinic acid, malic acid, tartaric acid, citric acid, ascorbic acid, methane sulfonic acid, ethane sulfonic acid, hydroxyethanesulfonic acid, benzoic acid, salicylic acid, p-aminosalicylic acid, toluene sulfonic acid or naphthalene sulfonic acids.

The following example illustrates the invention, the parts being by weight, unless otherwise stated and the relationship of parts by weight to parts by volume being the same as that of the gram to the cubic centimeter:

Example 8.5 parts of ethoxy-methylene-cyanacetic acid ethyl ester are introduced into 500 parts by volume of alcohol. The solution is then mixed with 2.5 parts by volume of hydrazine hydrate and the whole is heated for 6 hours under reflux. The mixture is then evaporated to dryness and the residue is crystallized from a small amount of water. 3-amino-4-carbethoxy-pyrazole of the formula

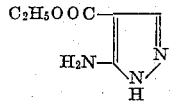

is obtained in the form of white crystals melting at 102–103° C. In the same manner ethoxy-methylene-cyanacetic acid methyl ester, or other alkyl esters can be reacted with hydrazine to yield 3-amino-4-carbomethoxy-pyrazole or the corresponding alkyl esters.

These products can be converted in the following manner into the 1,5-dimethyl-4-oxo-4,5-dihydro-pyrazolo(3,-4-d)pyrimidine which can be used as diuretic.

7.5 parts of 3-amino-4-carbethoxy-pyrazole or a corresponding amount of any other ester, such as the methyl ester or other alkyl esters are mixed with 30 parts by volume of formamide. The mixture is then heated for 8 hours in a bath having a temperature of 190–200° C. The mixture is allowed to cool, whereby a grey crystalline precipitate is formed, and the latter is filtered off with suction. The precipitate is dissolved in dilute caustic soda solution, the solution is agitated with animal charcoal and adjusted to a pH value of 3 to 4, with 2 N hydrochloric acid, whereupon a white precipitate separates out, and the latter is crystallized from a large quantity of boiling water, 4-hydroxy-1-pyrazolo(3,4-d)pyrimidine of the formula

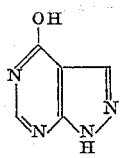

is obtained in white crystals which do not melt when heated at 350° C.

14 parts of 4-hydroxy-1-pyrazolo(3,4-d)pyrimidine are introduced into 150 parts by volume of a 2 N solution of caustic soda. 30 parts of dimethyl sulfate are slowly added to the solution, while stirring, and then the whole is further stirred for 10 hours at room temperature. The solution is then extracted several times with a large quantity of chloroform, and the residues from the combined extracts are crystallized from a large quantity of boiling alcohol. There are obtained two compounds, one of which is soluble in alcohol and melts at 181–182° C. It is the 1,5-dimethyl-4-oxo-4,5-dihydro-pyrazolo(3,4-d)-pyrimidine.

What is claimed is:

1. Process for the manufacture of new pyrazoles which comprises reacting a member selected from the group consisting of α-cyano-α-formyl-acetic acid esters and their reactive aldehyde derivatives with hydrazine.

2. Process for the manufacture of new pyrazoles which comprises reacting an enol ether of an α-cyano-α-formyl-acetic acid ester with hydrazine.

3. Process for the manufacture of new pyrazoles which comprises reacting an alkoxy methylene-cyanacetic acid alkyl ester with hydrazine.

4. Process for the manufacture of new pyrazoles which comprises reacting an ethoxymethylene-cyanacetic acid lower alkyl ester with hydrazine.

5. A member selected from the group consisting of esters of 3-amino-pyrazole-4-carboxylic acid and acid addition salts thereof.

6. Alkyl esters of 3-amino-pyrazole-4-carboxylic acid.

7. 3-amino-4-carbethoxy-pyrazole.

8. Acid addition salts of the compound of claim 7.

References Cited in the file of this patent
UNITED STATES PATENTS 2,759,949     Hitchings et al. _____ Aug. 21, 1956

OTHER REFERENCES

Elderfield: "Heterocyclic Compounds," vol. 5, pp. 64–6 (1957).

Fusco et al.: Chem. Abstracts, vol. 43, cols. 4257–8 (1949).